Aug. 11, 1959     C. A. HUBERT     2,899,034
INDEPENDENT POWER TAKE-OFF MECHANISM
Filed Oct. 29, 1956     4 Sheets-Sheet 1
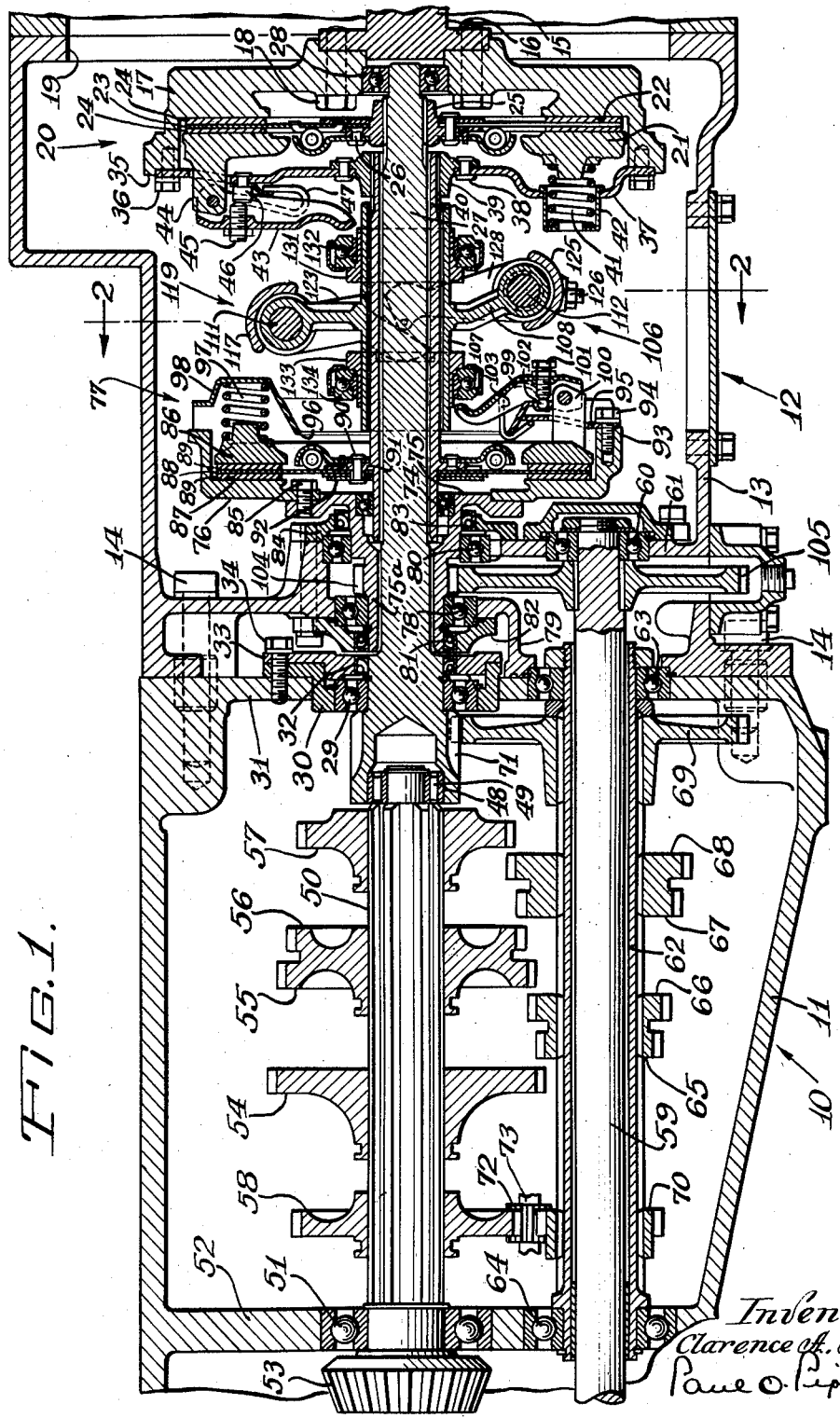
Inventor:
Clarence A. Hubert
Paul O. Pippel
Atty.

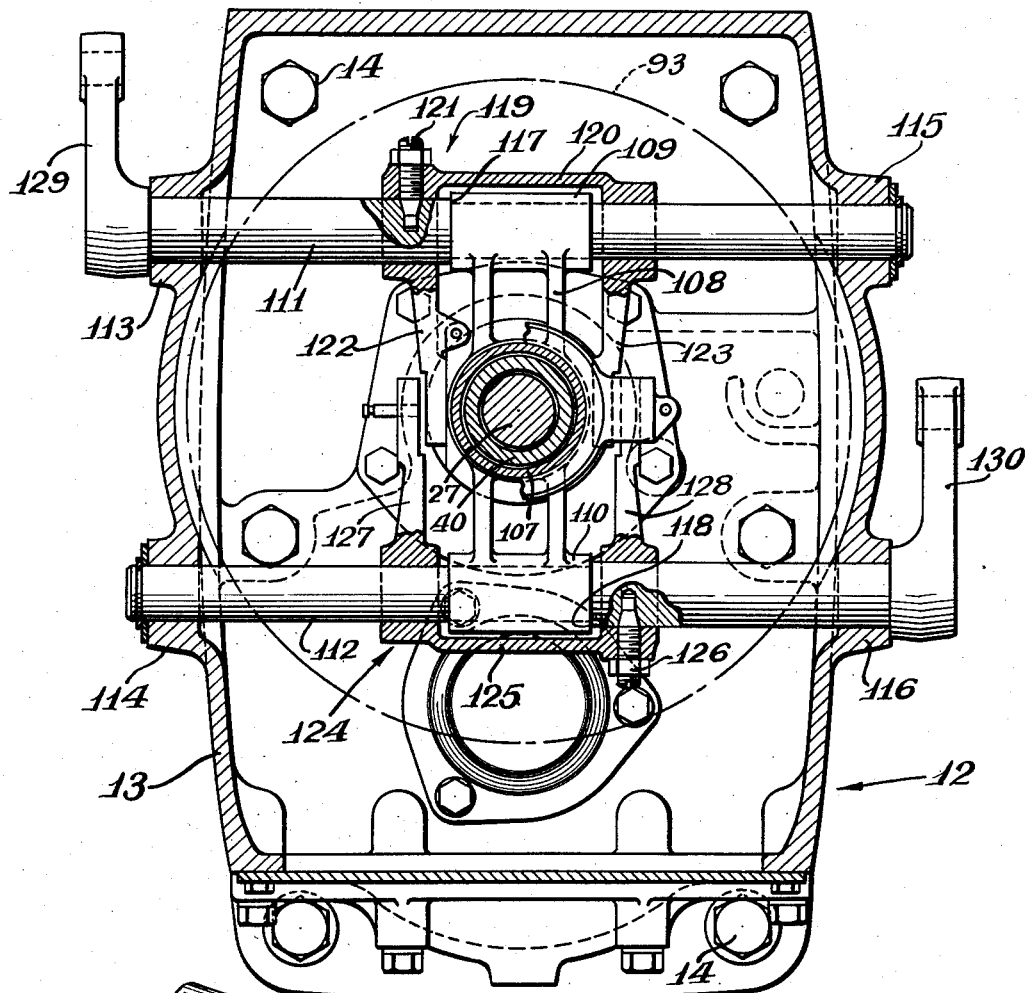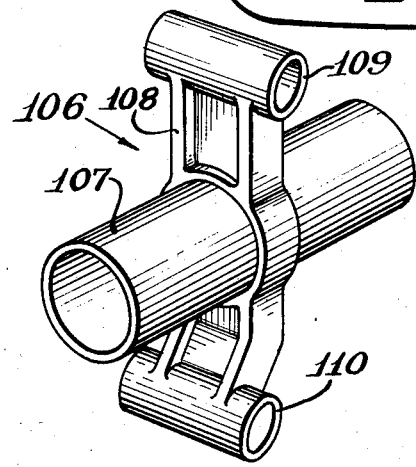

Aug. 11, 1959     C. A. HUBERT     2,899,034
INDEPENDENT POWER TAKE-OFF MECHANISM
Filed Oct. 29, 1956     4 Sheets-Sheet 3
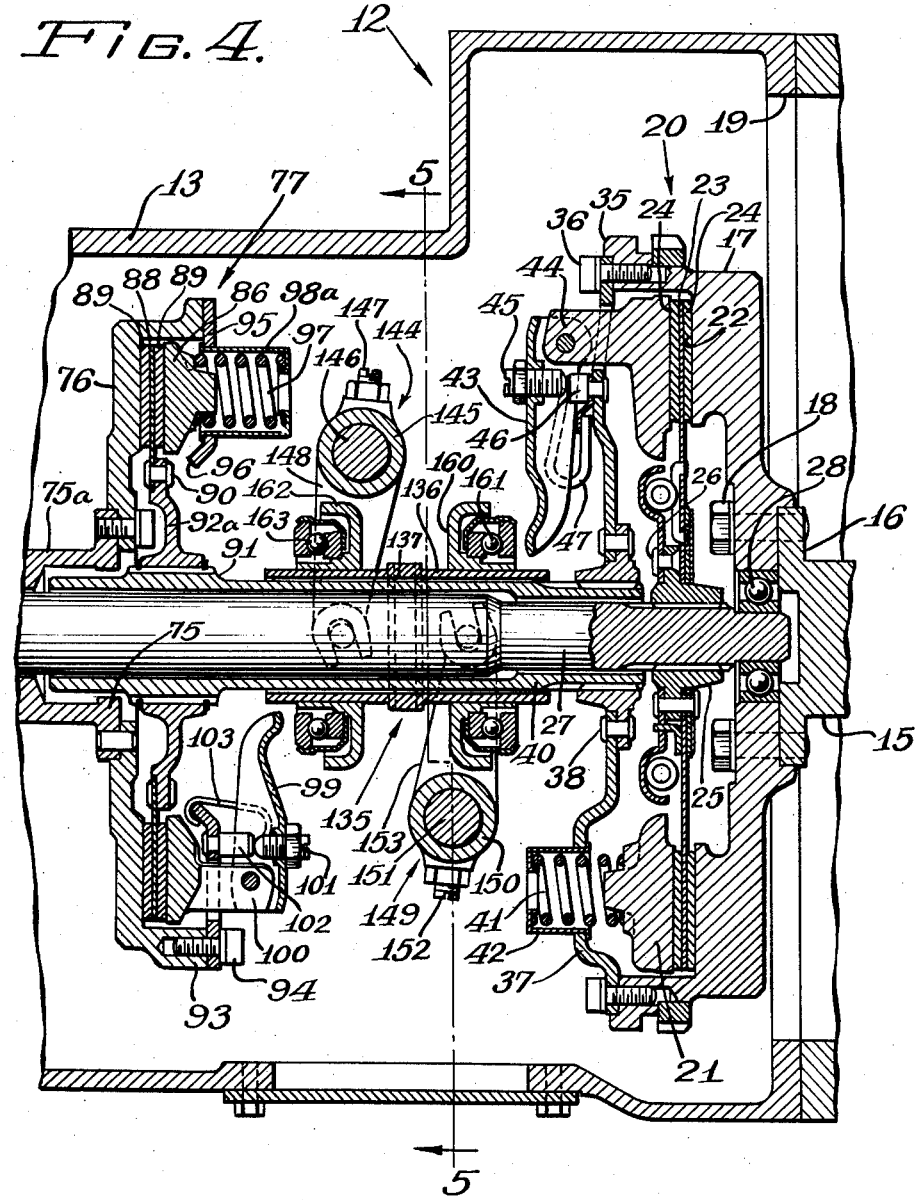
Inventor:
Clarence A. Hubert
Paul O. Rippel Atty.

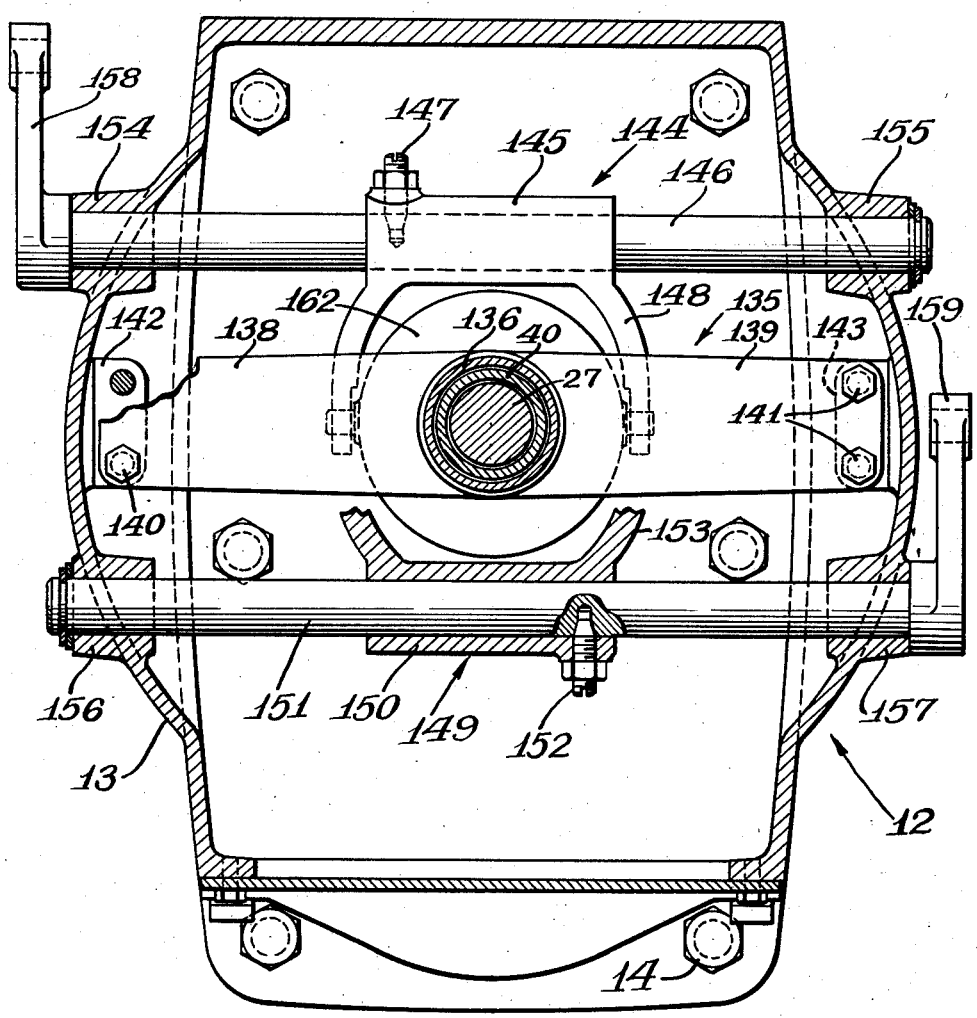

United States Patent Office 2,899,034
Patented Aug. 11, 1959

2,899,034

INDEPENDENT POWER TAKE-OFF MECHANISM

Clarence A. Hubert, Chicago, Ill., assignor to International Harvester Company, a corporation of New Jersey Application October 29, 1956, Serial No. 618,771

6 Claims. (Cl. 192—48)

This invention relates to power transmission mechanisms of vehicles and more particularly to a transmission mechanism of the type providing a power take-off auxiliary power shaft that is independently operable from the power plant of the vehicle.

In the past various types of power take-off mechanisms have been provided in vehicles such as trucks, tractors and the like, but, generally, such means as have heretofore been developed for tractors either, have not been completely satisfactory, or, as in most instances, have not been entirely independent of the operation or travel motion of the vehicle. In some of these prior art mechanisms the power take-off was driven by the gearing of the change-speed transmission of the vehicle, while other constructions were characterized by the requirement that the transmission be operated before power could be transmitted by the power take-off shaft, and in still other arrangements the power take-off shaft had to be operated continuously because of a direct driving connection with the vehicle power plant or other constantly rotating part.

Although some effort has, heretofore, been directed to the provision of an auxiliary or accessory power take-off drive mechanism which operated entirely independently of the motion of an allied vehicle, such structures as have been made for accomplishing this objective have, for one reason or another, not been entirely suitable or commercially acceptable. Generally these prior drives involved complicated and expensive mechanisms which frequently required costly rearrangements or realignments of the standard change-speed transmission elements, while, in addition, most of the devices so used were of a non-standard or non-conventional variety that were not economical in their utilization of space. Furthermore, the heat dissipating characteristics of the most compact of these prior drives was so poor that their adaptation and use were additionally discouraged on this premise.

The present invention proposes, and has for its primary objects, to provide an independent power take-off system for a tractor vehicle which overcomes the aforementioned shortcomings of the prior art structures, and which, furthermore, may be easily and inexpensively incorporated in a vehicle of conventional construction with a minimum of reconstruction or realignment of the standard parts thereof.

A general object is to provide means for the transmission of power from a vehicle power plant to an accessory power take-off or auxiliary drive shaft irrespective of whether or not the vehicle is being moved or propelled by the power plant.

Another general object is to provide a compact power take-off arrangement for tractors which includes mounting the power take-off shaft concentrically within a countershaft of the tractor change-speed transmission so as to simplify the construction of the transmission, as well as that of the power take-off assembly.

A more specific object is to provide a power take-off mechanism for a vehicle in which a pair of coaxially disposed clutches are arranged in a back-to-back relation with each such clutch independent of the operation of the other, and wherein one of the clutches functions as a main clutch for driving the vehicle while the other clutch functions as a secondary or auxiliary clutch for independently driving a power take-off shaft.

Another specific object is to provide, in a back-to-back arrangement of a pair of coaxially disposed clutches, a common bearing or journalling means, concentrically arranged relative to a shaft drivingly interconnecting said clutches and disposed axially therebetween, for reciprocally and rotatably mounting the individual throwout bearing mechanisms for said clutches.

A further specific object is to provide a pair of back-to-back, independently operable and coaxially arranged clutches having a common support means, disposed axially intermediate thereof, for supportably mounting the individual throwout and actuating mechanisms of each of said clutches, and wherein said common support means is carried by a housing enclosing said clutches.

Another object of the invention is to provide a power take-off for tractors which, although driven by the fly wheel of the engine thereof, operates independently of the conventional change-speed transmission clutch and is controlled by a separate clutch so that power may be transmitted from the tractor engine to any device, farm implement or other accessory driven by the power take-off shaft regardless of whether or not the tractor is in motion, and wherein the motion of the tractor may be controlled without affecting the operation of said driven device, farm implement or other accessory.

A still further specific object is to provide in a tractor having a power take-off shaft means including an auxiliary clutch engageable for connecting the power take-off shaft to the change-speed transmission clutch thereof, but which means is operable independently of the engagement or disengagement of said transmission clutch for transmitting power from the tractor engine to the power take-off shaft, and which auxiliary clutch means is provided with a throwout mechanism that rotates only momentarily during the instant of engagement and that of disengagement of said auxiliary clutch.

A yet still further object is to provide a pair of back-to-back and coaxially arranged clutches, one of which controls the motion of a vehicle and the other a power take-off shaft, which are operated completely independent of one another, and wherein the power take-off clutch is arranged so that the friction disc element assembly thereof constitutes a driving member while its associated and engaging body member with its gripping elements constitutes a driven member, which latter member rotates continuously only during the time said power take-off clutch is engaged.

Other objects and advantages will be understood and will become more apparent from the following description when read in conjunction with the accompanying drawings, in which:

Figure 1 is a longitudinal, side elevational, sectional view through a vehicle clutch and transmission drive incorporating a power take-off drive constructed according to the present invention;

Figure 2 is a vertical sectional view taken along the line 2—2 of Figure 1;

Figure 3 is a perspective view of the common bracket support provided for mounting both clutch throwout mechanisms;

Figure 4 is a view similar to Figure 1, less the transmission portion thereof, showing a modified arrangement for mounting the clutch actuating and throwout mechanisms, and Figure 5 is a vertical sectional view taken on line 5—5 of Figure 4, and is similar to Figure 2 but shows the modified mounting for the clutch actuating and throwout mechanisms.

In order ot obtain a comprehensive understanding of the present invention preferred embodiments thereof are illustrated in the attached drawings depicting a generally conventional transmission drive mechanism into which the improved clutching arrangement of the invention has been incorporated, while a description of the specific construction and its operation follows.

By referring to the drawings, Figures 1–3 in particular, it will be noted that a generally conventional change-speed transmission drive mechanism, represented generally by the reference character 10, is enclosed within a housing 11 disposed in axial alignment with a clutching structure, indicated generally by the numeral 12, which, in turn, is enclosed by a housing or casing 13 that is secured to said transmission housing by suitable securing means, such, for instance, as by the cap screws 14 disposed at intervals therearound. The transmission is, of course, adapted for driving connection with the propelling or ground engaging means of a vehicle, such as a tractor, while the clutch structure is intended for driving connection with a vehicle power-plant, as is well understood, but since the representation of these units or elements in the drawings is not essential to a proper understanding of the invention, for purposes of clarity and simplicity, they have not been included therein.

A crank shaft 15, which may be a continuation or an extension of the crank shaft of a suitable vehicle engine or power-plant (not shown), has a flanged end portion 16 thereon that provides suitable means for mounting a flywheel 17, that may be fixedly secured thereto by conventional means such as the bolts 18. An aperture 19 in the engine or forward end of the clutch housing 13 is provided to freely admit the passage of said flywheel. The flywheel 17, as constituted, forms the driving member of a first or main clutch, indicated generally by the reference numeral 20, and conventionally supports a pressure plate 21 mounted for reciprocation toward and away from the friction face 22 of said flywheel. A clutch disc 23, having annular friction linings 24 on opposite sides thereof, is positioned between said pressure plate and the flywheel and is mounted, by suitable well known means such as the rivets 26, on a hub assembly 25 which, in turn, is splined onto and is axially slidable along a drive shaft 27. The engine end of said drive shaft is journalled in an anti-friction bearing 28 mounted in axial alignment with the crank shaft 15 in a recess in said flywheel, while the opposite or transmission end of said drive shaft is journalled in an anti-friction bearing 29 disposed in a boss-like insert 30, in turn, mounted in an end wall 31 of the transmission housing 11. An oil seal 32 surrounding said shaft adjacent the bearing 29 is retained in position by a cover plate, such as 33, which is affixed to the wall 31 by suitable means such as the bolts 34 (only one of which shows).

The flywheel driving member 17, of the main clutch 20, has an outer flange or rim 35 thereon to which there is secured, by conventional bolt means 36, a back-up or cover plate member 37. Said back-up plate, additionally, is fixedly mounted, by suitable means such as the rivets 38, on a hub 39 that, in turn, is splined for axial movement onto one end of a sleeve-like hollow shaft 40 concentrically disposed with respect to the drive shaft 27. The pressure plate 21 is normally biased to an engaging position by a plurality of coiled spring members 41 (only one of which is shown) which are positioned in compression against said pressure plate while the opposite ends thereof rest in cup-like retainers 42 mounted in openings in the back-up plate member 37. A plurality of actuating fingers or release levers 43 (only one of which is shown) are pivotally mounted on axially extending posts or studs, such as the one shown at 44, carried by the pressure plate 21 and which project through openings in the back-up plate 37, while an adjustable set screw 45 threadably anchored in each of said release levers is adapted to engage a button-like stop or bumper 46 affixed to the back-up plate 37. A spring member 47 beneath each of said release levers reacts to force the respective release finger away from its associated bumper stop. The type of clutch above described is somewhat conventional and is frequently referred to in the trade as a split-torque clutch because it serves to divide torque between the drive shaft 27 and the hollow shaft 40, and as thus arranged said latter hollow shaft will normally rotate as long as the flywheel rotates without any coordinating action on the part of the vehicle operator.

The drive shaft 27 extends into the transmission housing 11 and has a recess 48 in the transmission end thereof that receives an anti-friction bearing 49 which journals a reduced end portion of a splined transmission or output shaft 50, while the opposite end of said shaft is journalled in an anti-friction bearing 51 mounted in an opening in the end wall 52 of said transmission housing. A beveled pinion gear 53 on the outer or rear end of said output shaft is adapted for meshing engagement with a ring gear forming part of the vehicle's final drive (neither of which are shown). This splined output shaft is provided with a first-speed gear 54, a second-speed gear 55, a third speed gear 56 and a fourth speed gear 57 plus a reverse gear 58.

A power take-off shaft 59, which has one end thereof journalled in an anti-friction bearing 60 mounted in an opening of a wall 61, in clutch housing 13, extends through both end walls of the transmission housing 11 while the opposite end thereof is suitably journalled in an anti-friction bearing (not shown) mounted in a rear portion of the vehicle. Said power take-off shaft has a portion thereof surrounded by a quill-like counter shaft 62 which, preferably, is radially spaced therefrom, and is journalled, at one end in an anti-friction bearing 63 mounted in an opening in the end wall 31 of said transmission housing, and at the opposite end in an anti-friction bearing 64 mounted in the opposite end wall 52 of said housing. This latter shaft is also provided with a plurality of gears mounted thereon for rotation therewith that are adapted for selective meshing with the respective gears of the output shaft 50 in order to obtain the desired speed ratios through the transmission. The gears included on said counter-shaft are, respectively, a first gear 65, a second gear 66, a third gear 67, a fourth gear 68, a driving gear 69 and a reverse gear 70. The driving gear 69 meshes with a gear 71 on the transmission end of the drive shaft 27. Mounted between the reversing gears 58 and 70 is an idler gear 72 that is suitably mounted on a shaft 73 which is only fragmentarily shown in Figure 1. As is well understood in conventional change-speed transmissions of the character illustrated the gears 54, 55, 56, 57 and 58 are shifted axially along the shaft 50 by suitable shifting means (not shown) to effect meshing engagement with the respectively selected gears on the countershaft 62 that will provide the particular speed ratio desired.

The sleeve-like hollow shaft 40, at its rearward or transmission end, is journalled in an antifriction bearing 74 that, in turn, is mounted in a recess in a hub 75 that together with a drum-like member 76 forms a body portion for a secondary or auxiliary clutch, designated generally by the reference numeral 77. Said hub has an axially extending sleeve-like portion 75a that is journalled at one end in an anti-friction bearing 78 positioned in an opening in an end wall 79 of the clutch housing 13, and at its opposite end in an anti-friction bearing 80 disposed in a transverse wall member 61, which latter wall member is axially spaced forwardly from that of the wall 79. An oil seal 81 positioned around the transmission end of the sleeve portion 75a of hub 75 is fixed in place by a suitable retainer ring, such as that shown at 82, while a similar oil seal 83 surrounding said hub's sleeve proximate the opposite end thereof is fixedly positioned by the retainer ring 84. The hub 75, as illustrated, is fashioned separately from the drum portion 76 and may be suitably affixed thereto, by conventional means such as the bolts 85 (only one of which shows in the drawings), although, as will be well understood, these particular elements may be integrally fashioned without deviating from any teachings of the present invention.

The clutch drum 76 conventionally supports a pressure plate 86 mounted for reciprocation toward and away from the friction face 87 of said drum. A clutch disc 88, having annular friction linings 89 on opposite sides thereof, is positioned between said pressure plate and the drum member 76 and is mounted, by suitable well-known means such as the rivets 90, on an annular ring or collar 91 which, preferably, is fashioned integral with the hollow shaft 40. A pair of back-up plates 92 may be positioned, as indicated, to axially reinforce or stabilize the clutch disc 88. The drum member 76 has an outer flange or rim 93 thereon to which there is secured, by conventional bolt means 94, a back-up or cover plate member 95 having an opening 96 therein which, is concentric with the hollow shaft 40. The pressure plate 86 is biased to a normally engaging position by a plurality of coiled spring members 97 (only one of which is shown) which are positioned in compression against said plate while the opposite ends thereof rest in cup-like retainers 98 formed in the back-up plate member 95. A plurality of actuating fingers or release levers 99 (only one of which is shown) are pivotally mounted on axially extending posts or studs, such as shown at 100, which are carried by the pressure plate 86 and project through openings in the back-up plate 95, while an adjustable set screw 101 threadably anchored in each of said latter release levers is adapted to engage a stop or bumper 102 affixed to said back-up plate. A spring member 103 beneath each of said release levers reacts to force the respective release finger away from its associated bumper stop. While the structure of said secondary or auxiliary clutch is somewhat conventional the operation thereof in the present arrangement is unique and novel because the disc element 88 is constituted as the driving member and transmits drive from the hollow shaft 40 to the driven body member 76 which, through a gear 104 on the sleeve portion 75a of the hub 75, in turn, transmits the drive to a gear 105 with which it is in meshing relation and which latter gear is mounted on the power take-off shaft 59 and constrained for rotation therewith.

Mounted concentric with the hollow shaft 40 is a bracket support member, indicated generally by the reference numeral 106, which includes an axially extending sleeve-like bearing portion 107 and a bracket body portion 108, as best seen in the perspective view of Figure 3. Said body has an upper transversely extending journal portion 109 and a lower transversely extending journal portion 110, both of which are adapted for rotatably receiving transversely disposed rock shafts 111 and 112, respectively. Said rock shafts are rotatably supported in the upper journal bosses 113, 115 and in the lower journal bosses 114, 116 which bosses, in turn, may be fashioned as portions of the clutch housing 13. The interior or inside diameter of the sleeve-like bearing portion 107 is proportioned, preferably, to provide a slight radial clearance between the inner surface thereof and the outer surface of the hollow shaft 40, whereby said shaft may rotate when positioned therewithin. As viewed in Figure 2, it will be noted that the right-hand portion of rock shaft 111 is slightly smaller in diameter than that of the left-hand side thus providing a shoulder 117 against which the journal portion 109 abuts, while a similar shoulder 118 formed on rock shaft 112 is oppositely positioned so that when the bracket 106 is positioned on said shafts and between said shoulders it will be constrained against transverse movement along said rock shafts although said shafts may freely rotate therewithin.

A bifurcated or yoke-like throwout lever 119 has a connecting body portion 120 that is mounted on the upper rock shaft 111 and constrained for rotation therewith by the adjusting screw 121, while a pair of transversely spaced arm members 122, 123 extend therefrom and are adapted to rotate about the axis of said upper rock shaft. A similar bifurcated or yoke-like throwout lever 124 has a connecting body portion 125 that is mounted on the lower rock shaft 112 and constrained for rotation therewith by the adjusting screw 126, while a pair of transversely spaced arm members 127, 128 extend therefrom and are adapted to rotate about the axis of said latter rock shaft. The rock shafts 111 and 112 have exteriorly connected link arms 129 and 130, respectively, which are adapted for connection with suitable independent or separately operable foot or hand manipulated mechanisms which are actuable by the operator of the vehicle, but since these particular manipulating mechanisms are not pertinent to a clear understanding of the invention they have not been shown in the drawings hereof.

The clutch throwout mechanism for the main or master clutch 20 comprises a sliding collar 131, slidably mounted on the sleeve-like bearing portion 107, of the bracket support 106, and a conventional throwout bearing mechanism 132 carried by said collar and adapted for engaging the clutch fingers 43 for reciprocating the pressure plate 21 thereof. The arms 127, 128 upon rotation of the throwout lever 124 are adapted to engage the collar 131 and axially slide said collar until the throwout bearing 132 engages the actuating or release fingers 43 which, in turn, then cause reciprocation of the plate 21 and disengagement of the clutch 20. In like manner the secondary or auxiliary clutch 77 is provided with a throwout mechanism that includes a sliding collar, slidably mounted on the sleeve portion 107, and a conventional throwout bearing mechanism 134 carried by said collar for engaging the fingers 99 of said latter clutch. The arms 122, 123 upon rotation of the throwout lever 119 are adapted to engage the collar 133 and axially slide said collar until the throwout bearing 134 engages the actuating or release fingers 99 which, in turn, then cause reciprocation of the pressure plate 86 and disengagement of the clutch 77.

In operation, power from the vehicle's power plant (not shown) is transmitted from the crankshaft 15 through the clutch 20 to the drive shaft 27, which, in turn, through the meshing gears 71 and 69, transmits drive through the duly selected gears of the change-speed transmission 10 to the pinion gear 53. Since said latter gear constitutes part of the vehicle's final drive it will be understood drive or power is subsequently transmitted to the ground engaging means of the vehicle to effect the propulsion desired. Operation of the drive shaft 27 is controlled by engagement and disengagement of the master clutch 20, which, as previously noted, is independently operable.

Operation of the flywheel driving member 17, of the clutch 20, also causes rotation of the affixed cover plate 37 and hence the hollow shaft 40 constrained for rotation therewith. Since the driving disc assembly 88, of clutch 77, is also constrained for rotation with the hollow shaft 40 it will be appreciated that this clutch disc element will rotate continuously so long as the flywheel 17 is rotating, and if clutch 77 is engaged, power will also be transmitted, by way of the driven body member 76 thereof, to the meshing gears 104, 105. Since gear 105 is constrained for rotation with the power take-off shaft 59 auxiliary power becomes available at the opposite end of said shaft for the operation of any device, farm implement or other accessory as desired. As previously mentioned the clutch 77 is independently operable thus this clutch may be disengaged and power flow to the power takeoff shaft interrupted without in any way interfering with the concomitant propulsion of the vehicle which, of course, is independently controlled by the clutch 20. In view of the fact that the clutch disc element 88 of this secondary clutch rotates continuously with the hollow shaft 40 and serves as the driving element thereof it will be appreciated that the heavier and bulkier driven body member 76 is operative only during the periods when the power take-off shaft requires power. Furthermore, the throwout bearing 134 rotates and is rotatively operative only momentarily during the instant of engagement and disengagement of this clutch thus the wear on this element is reduced to such an absolute minimum that the life of this throwout mechanism is considerably extended.

In Figures 4 and 5 there is illustrated a modified embodiment of the present invention, but, since the modifications involved therein relate only to the means for supporting the clutch throwout and actuating mechanisms, the remainder of the device being the same as depicted in Figures 1–3, the elements not pertinent to this specific embodiment have, for purposes of clarity and simplicity, been omitted from these particular figures of the drawings. Likewise, in order to simplify the description and to obtain a clearer understanding of the invention similar structural elements in both embodiments have been designated by the same reference numerals.

Referring now to Figures 4 and 5, it will be noted that the master clutch 20, being substantially identical with that shown in Figure 1, operates to drivingly connect the crankshaft 15 with the drive shaft 27, and, through the back-up plate member 37, with the hollow shaft 40, as before.

The secondary or auxiliary clutch 77 includes a hub 75 that together with the driven drum-like member 76 forms a body portion therefor, while said hub also has an axially extending sleeve portion 75a, that cooperates with journalling means and connects with the power take-off shaft, as heretofore described in connection with the embodiment of Figures 1–3. Said hub may be fashioned separately from the driven drum portion 76 and suitably affixed thereto, by conventional means such as the bolts 85 (only one of which shows in the drawings), although, as will be understood, these particular elements may also be integrally fashioned without deviating from any teachings of the instant invention. The clutch driven member 76 conventionally supports the pressure plate 86 mounted for reciprocation toward and away from the friction face 87 thereof, while the clutch disc 88 with its annular friction linings 89 is positioned between said pressure plate and the driven member 76. The disc 88 in this embodiment is mounted, by suitable well-known means such as the rivets 90, on a hub 92a which is splined onto a ring or collar 91 fashioned, preferably, integral with the hollow shaft 40. An outer flange or rim 93 on the driven member 76 has secured thereto, by conventional bolt means 94, a back-up or cover plate 95 having an opening 96 therein concentric with the sleeve shaft 40. Coiled spring members 97 (only one of which shows) positioned in compression against said pressure plate and in the cup-like retainers 98a mounted in openings in said back-up plate operate to bias said pressure plate into a normally engaging position. Actuating fingers or release levers 99 pivotally mounted on studs 100 carried by the pressure plate 86, have adjustable set screws 101 threadably anchored therein which engage stops or bumpers 102 when said fingers are depressed to disengage the clutch, while spring members 103 react to force the respective release fingers away from said stops when the clutch is engaged.

Mounted concentric with the hollow shaft 40 is a bracket support member, indicated generally by the reference numeral 135, which includes an axially extending sleeve-like bearing portion 136 and a bracket body portion 137 formed with outwardly extending arms 138, 139. Said arms extend transversely across the clutch housing 13 and are affixed, by suitable securing means such as the bolts 140, 141, respectively, to ear-like projections 142, 143 which, preferably, are formed integral with said clutch housing. The inside diameter of the sleeve bearing portion 136 is proportioned, preferably, to provide a slight radial clearance between the inner surface thereof and the outer surface of the hollow shaft 40, whereby said latter shaft may rotate freely when positioned therewithin.

A bifurcated or yoke-like throwout lever 144 has a central connecting body portion 145 that is mounted on an upper rock shaft 146 and constrained for rotation therewith by an adjusting screw 147, while a pair of transversely spaced arms in the form of a yoke 148 extend therefrom and are adapted to rotate about the axis of said upper rock shaft. A similar bifurcated or yoke-like throwout lever 149 has a central connecting body portion 150 that is mounted on a lower rock shaft 151 and constrained for rotation therewith by an adjusting screw 152, while a pair of transversely spaced arms in the form of a yoke 153 extend therefrom and are adapted to rotate about the axis of said lower rock shaft. The rock shafts 146 and 151, respectively, are rotatably supported in the upper journal bosses 154, 155 and in the lower journal bosses 156, 157 which bosses, in turn, may be fashioned as portions of the clutch housing 13. Said rock shafts have exteriorly affixed link arms 158, 159, respectively, which are adapted for connection with suitable independent or separately operable foot or hand manipulated mechanisms which are actuable by the vehicle operator, as previously described.

The clutch throwout mechanism for the first or main clutch 20 comprises a sliding collar 160, slidably mounted on the sleeve bearing portion 136, of bracket 135, and a conventional throwout bearing mechanism 161 carried by said collar and adapted for engaging the clutch fingers 43 for reciprocating the pressure plate 21 thereof. The yoke 153, of throwout lever 149, upon rotation is adapted to engage the collar 160 and axially slide said collar until its associated throwout bearing 161 engages the actuating fingers 43 which, of course, reciprocate the plate 21 for disengagement of said main clutch. In like manner the second or auxiliary clutch 77 is provided with a throwout mechanism that includes a sliding collar 162, slidably mounted on the sleeve 136, and a conventional throwout bearing mechanism 163 carried by said collar for engaging the clutch fingers 99 and reciprocating the pressure plate 86 thereof. The yoke 148, of throwout lever 144, is adapted to engage the collar 162 and axially slide said collar until its associated bearing 163 engages the actuating fingers 99 which, of course, reciprocate the plate 86 for disengagement of said auxiliary clutch.

From the above it will be appreciated that there has been shown and described an improved transmission drive and clutch mechanism which provides a power take-off shaft that may be completely independently operated regardless of whether or not the vehicle into which it is incorporated is in motion. Furthermore, the proposed invention envisages utilizing a large percentage of conventional parts and elements, thus requiring a minimum of change or alteration in the structural arrangements of the vehicle. In addition, the present invention contemplates long life for the throwout mechanisms because they receive their severest use only momentarily during engagement and disengagement of the clutches.

Although only preferred forms of the invention have been illustrated, and described in detail, it will be apparent to those skilled in the art that various other modifications may be made therein without departing from the spirit of the invention or from the scope of the appended claims.

What is claimed is:

1. In a drive mechanism adapted for use with a tractor vehicle, the combination, comprising: an engine shaft; a drive shaft disposed coaxially with said engine shaft; a first clutch having a driving member connected to said engine shaft for rotation therewith, and a driven disc element drivingly connected to said drive shaft and engageable with said driving member for rotation therewith; a hollow shaft surrounding said drive shaft; means directly connecting said hollow shaft to said first clutch driving member in an axially slidable relation, for rotation of said hollow shaft independent of the operation of the driven disc element of said first clutch; a second clutch spaced axially from said first clutch; said second clutch including a driven body member having spring-loaded pressure plate elements carried thereon and being disposed for rotation concentrically around said drive shaft, and a driving friction disc assembly drivingly connected to said hollow shaft axially intermediate said driven body member and said first clutch driven disc element and being adapted for engagement by said spring-loaded pressure plate elements for rotating said driven body member therewith; bracket means mounted intermediate said clutches and having an axially extending hollow bearing portion disposed concentrically relative to said hollow shaft; a separate clutch actuating means for each clutch being mounted on part on said hollow bearing portion and arranged for actuating said clutches independently of one another; said clutch actuating means for said second clutch including a throwout mechanism engageable with the driven body member of said second clutch to disengage said latter clutch and stop the rotation of said driven body member while the said clutch is so disengaged.

2. In a drive mechanism adapted for use with a tractor vehicle, the combination, comprising; an engine shaft; a drive shaft disposed coaxially with said engine shaft; a first clutch having a driving member connected to said engine shaft for rotation therewith, and a driven disc element drivingly connected to said drive shaft and engageable with said driving member for rotation therewith; a hollow shaft surrounding said drive shaft; means directly connecting said hollow shaft to said first clutch driving member in an axially slidable relation, for rotation of said hollow shaft independent of the operation of the driven disc element of said first clutch; a second clutch spaced axially from said first clutch; said second clutch including a driven body member having spring-biased pressure plate elements carried thereon and being disposed for rotation concentrically around said drive shaft, and a driving friction disc assembly drivingly connected to said hollow shaft axially intermediate said driven body member and said first clutch driven disc element and being adapted for engagement by said spring-biased pressure plate elements for rotating said driven body member therewith; bracket means mounted intermediate said clutches and having an axially extending hollow bearing portion disposed concentrically relative to said hollow shaft; a separate clutch actuating means for each clutch being mounted in part on said hollow bearing portion and arranged for actuating said clutches for transmitting drive or interrupting the transmission of drive through each of said clutches independently of one another; said clutch actuating means for said second clutch including a throwout mechanism reciprocally and rotatably mounted on said hollow bearing portion and engageable with the driven body member of said second clutch to disengage said latter clutch and concomitantly to stop rotation of said driven body member and that of said throwout mechanism while the said clutch is so disengaged.

3. In a drive mechansim adapted for use with a tractor vehicle, the combination, comprising: an engine shaft; a drive shaft disposed coaxially with said engine shaft; a clutch housing; a first clutch disposed within said housing and having a driving member connected to said engine shaft for rotation therewith, and a driven disc element drivingly connected in an axially slidable relation to said drive shaft; a hollow shaft surrounding said drive shaft in spaced relation therefrom; means directly connecting said hollow shaft to said first clutch driving member for rotation of said hollow shaft independent of the operation of said driven disc element of said first clutch; a second clutch disposed within said housing and axially spaced from said first clutch; said second clutch including a driven body member having spring-loaded pressure plate means carried thereon and having said latter member disposed for rotation concentrically with respect to said hollow shaft, and a driving friction disc assembly mounted on said hollow shaft axially intermediate said driven body member of said second clutch and the driven disc element of said first clutch and adapted for engagement by the spring-loaded pressure plate means of said driven body member for drivingly connecting said driven body member to said engine shaft; bracket means carried by said clutch housing axially intermediate said clutches and having an axially extending hollow bearing portion disposed concentrically with respect to said hollow shaft and in spaced relation therefrom; a separate clutch actuating means for each clutch mounted on said bracket means and arranged for actuating said clutches independently of one another; each of said actuating means including a throwout mechanism reciprocally and rotatably mounted on said hollow bearing portion and disposed one on either end thereof proximate an associated clutch; said second clutch throwout mechanism being arranged for engaging the driven body member of said second clutch to disengage said latter clutch and concomitantly with the disengagement thereof to stop rotation of said driven body member and that of said latter throwout mechanism during the time said second clutch is disengaged.

4. In a drive mechanism adapted for use with a tractor vehicle, a combination, comprising: an engine shaft; a drive shaft disposed coaxially with said engine shaft; a clutch housing; a first clutch disposed within said housing and having a driving member connected to said engine shaft for rotation therewith, and a driven disc element drivingly connected in an axially slidable relation to said drive shaft; a hollow shaft surrounding said drive shaft in space relation therefrom; said first clutch having a back-up plate member connected to the driving member thereof for rotation therewith; said hollow shaft being connected in an axially slidable relation with said back-up plate member for rotation of said hollow shaft independent of the operation of said driven disc element of said first clutch; a second clutch disposed within said housing and axially spaced from said first clutch; said second clutch including a driven body member having spring-biased pressure plate means carried thereon and having said driven body member disposed for rotation concentrically of said drive shaft, and a driving friction disc assembly mounted on said hollow shaft and constrained for rotation therewith; said driving friction disc assembly being disposed axially intermediate the driven body member of said second clutch and the driven disc element of said first clutch and adapted for engagement by the spring-biased pressure plate means of said driven body member for drivingly connecting said driven body member to said engine shaft; bracket means disposed axially intermediate said clutches including an axially extending hollow bearing portion surrounding said hollow shaft in spaced relation therefrom; transversely extending support means carried by said clutch housing and arranged for supporting said bracket means thereon; a separate clutch throwout mechanism for controlling the engagement and disengagement of each clutch being reciprocally and rotatably mounted on said hollow bearing portion proximate the respective clutch each said mechanism controls; said second clutch throwout mechanism being arranged for engaging the driven body member of said second clutch to disengage said latter clutch and concomitantly with the disengagement thereof to stop rotation of said driven body member and that of said latter throwout mechanism during the time said second clutch is disengaged; and actuating means pivotally mounted on said transverse support means operable for actuating said clutch throwout mechanism independently of one another.

5. In a drive mechanism adapted for use with a tractor vehicle, the combination, comprising: an engine shaft; a drive shaft disposed coaxially with said engine shaft; a clutch housing; a first clutch disposed within said housing and having a driving member connected to said engine shaft for rotation therewith, and a driven disc element drivingly connected to said drive shaft; a hollow shaft surrounding said drive shaft in spaced relation therefrom; means directly connecting said hollow shaft to said first clutch driving member for rotation of said hollow shaft independent of the operation of said driven disc element of said first clutch; a second clutch disposed within said housing and axially spaced from said first clutch; said second clutch including a driven body member having spring-loaded pressure plate means carried thereon and having said latter member disposed for rotation concentrically with respect to said hollow shaft, and a driving friction disc assembly mounted on said hollow shaft and constrained for rotation therewith and disposed axially intermediate said driven body member of said second clutch and the driven disc element of said first clutch, and adapted for engagement by the spring-loaded pressure plate means of said driven body member for drivingly connecting said driven body member to said engine shaft; bracket means carried by said clutch housing axially intermediate said clutches and having an axially extending hollow bearing portion disposed concentrically with respect to said hollow shaft and in spaced relation therefrom; a pair of transversely disposed supports carried by said housing; a separate clutch actuating means for each clutch pivotally mounted one on each of said transverse supports and arranged for actuating said clutches independently of one another; each of said actuating means including a throwout mechanism for controlling the engagement and disengagement of each clutch that is reciprocally and rotatably mounted on said hollow bearing portion and disposed one on either end thereof proximate the respective clutch said mechanism controls; said second clutch throwout mechanism being arranged for engaging the driven body member of said second clutch to disengage said latter clutch and concomitantly with the disengagement thereof to stop rotation of said driven body member and that of said throwout mechanism during the time said second clutch is disengaged.

6. In a drive mechanism adapted for use with a tractor vehicle, the combination, comprising: an engine shaft; a drive shaft disposed coaxially with said engine shaft; a clutch housing; a first clutch disposed within said housing and having a driving member connected to said engine shaft for rotation therewith, and a driven disc element drivingly connected to said drive shaft; a hollow shaft surrounding said drive shaft in spaced relation therefrom; means directly connecting said hollow shaft to said first clutch driving member for rotation of said hollow shaft independent of the operation of said driven disc element of said first clutch; a second clutch disposed within said housing and axially spaced from said first clutch; said second clutch including a driven body member having spring-biased pressure plate means carried thereon and having said latter member disposed for rotation concentrically with respect to said hollow shaft, and a driving friction disc assembly mounted on said hollow shaft and constrained for rotation therewith and disposed axially intermediate said driven body member of said second clutch and the driven disc element of said first clutch, and adapted for engagement by the spring-biased pressure plate means of said driven body member for drivingly connecting said driven body member to said engine shaft; bracket means carried by said clutch housing axially intermediate said clutches and having an axially extending hollow bearing portion disposed concentrically with respect to said hollow shaft and in spaced relation therefrom; a pair of transversely extending rock shafts carried by said housing and disposed one above and one below said hollow bearing portion; a separate clutch actuating mechanism for each clutch pivotally mounted one on each of said transverse shafts and arranged for actuating said clutches independently of one another; each of said actuating mechanisms including a throwout portion for effecting engagement and disengagement of a respective clutch; said throwout portions being reciprocally and rotatably mounted on said hollow bearing portion and disposed one on either end thereof proximate an associated clutch; said second clutch throwout portion being arranged for engaging the driven body member of said second clutch so as to effect the disengagement of said latter clutch and concomitant therewith to stop rotation of said driven body member and that of said throwout portion during the time said second clutch is disengaged.

References Cited in the file of this patent

UNITED STATES PATENTS

| 2,136,049 | Hering | Nov. 8, 1938 |
| 2,287,302 | Gifford et al. | June 23, 1942 |
| 2,609,900 | Neracher et al. | Sept. 9, 1952 |

FOREIGN PATENTS

| 635,042 | Great Britain | Mar. 29, 1950 |
| 1,129,587 | France | Sept. 10, 1956 |